No. 770,609. PATENTED SEPT. 20, 1904.
J. M. ROBERTS.
PLANTER.
APPLICATION FILED NOV. 25, 1903.
NO MODEL. 2 SHEETS—SHEET 1.
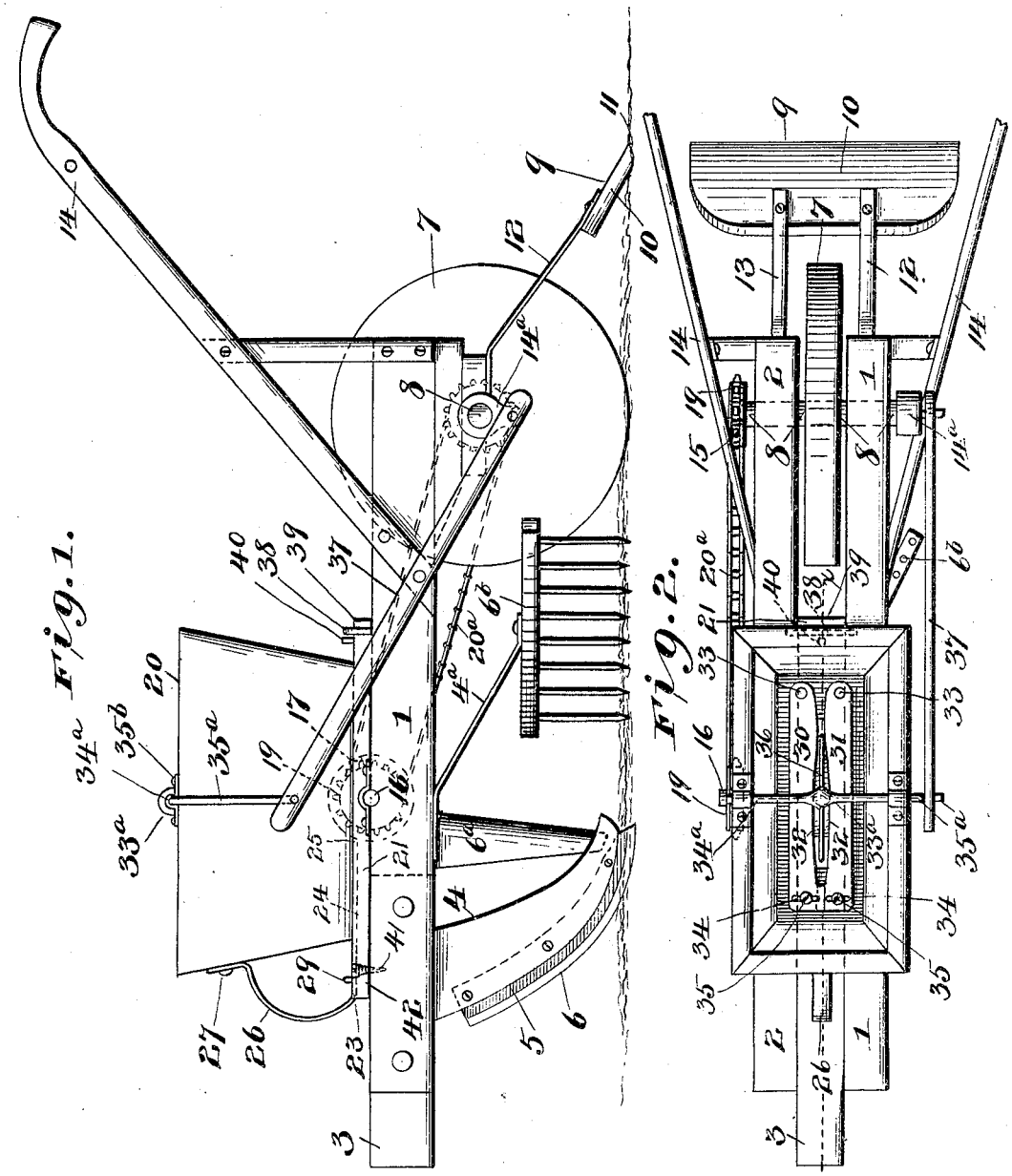
Witnesses
Jas. H. Blackwood
E. Hart
Inventor
Jessie M. Roberts
By William Bickford
Attorney No. 770,609. PATENTED SEPT. 20, 1904.
J. M. ROBERTS.
PLANTER.
APPLICATION FILED NOV. 25, 1903.
NO MODEL. 2 SHEETS—SHEET 2.

Inventor
Jessie M. Roberts

Witnesses

No. 770,609. Patented September 20, 1904.

UNITED STATES PATENT OFFICE.

JESSIE M. ROBERTS, OF BELL, FLORIDA.

PLANTER.

SPECIFICATION forming part of Letters Patent No. 770,609, dated September 20, 1904.

Application filed November 25, 1903. Serial No. 182,697. (No model.)

*To all whom it may concern:*

Be it known that I, JESSIE M. ROBERTS, a citizen of the United States, residing at Bell, county of Alachua, State of Florida, have invented certain new and useful Improvements in Planters; and I do hereby declare the following to be a full, clear, and exact description of the invention, such as will enable others skilled in the art to which it pertains to make and use the same.

My invention relates to an improvement in planters for corn, cotton-seed, peas, rice, &c., and has for its object to provide a planter which is very simple, inexpensive, and durable in construction and easy in operation and which will cut and open the furrow, plant the corn, cotton, or other seed, cover it, and roll and level the ground.

It also has for its object to provide a planter which can be adjusted to plant in hills as well as in continuous rows.

The invention consists in the several features, combination, and arrangement of features, as more fully hereinafter described and claimed.

Figure 3:
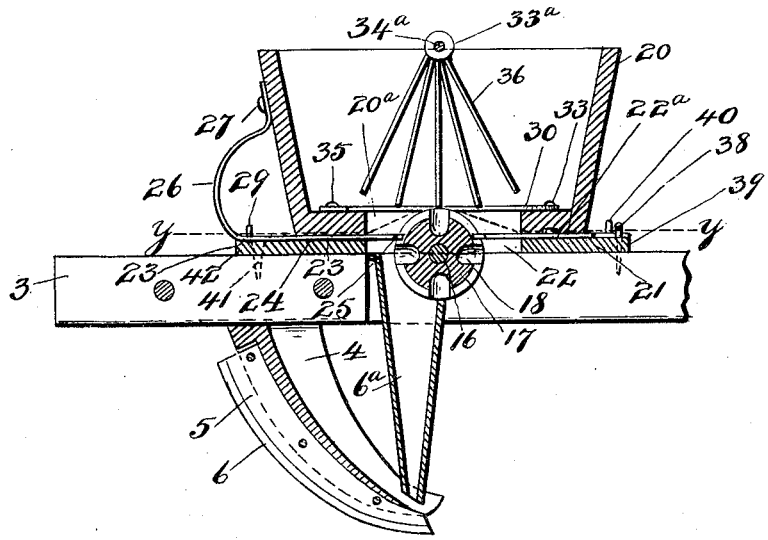
Figure 4:
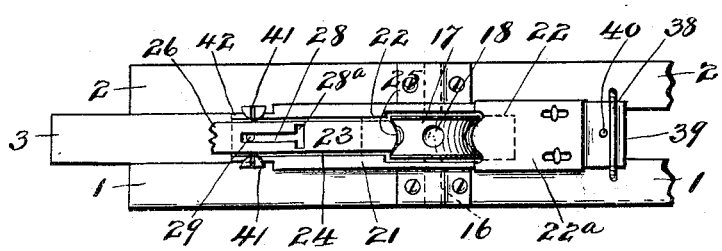
Figure 5:
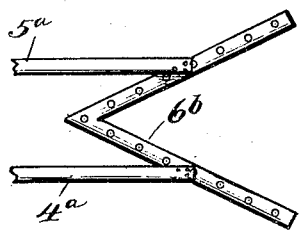

In the drawings which illustrate my invention, Figure 1 is a side view in elevation; Fig. 2, a top plan; Fig. 3, a central vertical section on line $x\ x$ of Fig. 2; Fig. 4, a horizontal section on line $y\ y$ of Fig. 3, and Fig. 5 a detail top plan view of the toothed coverer.

Corresponding parts in all the figures are denoted by the same reference characters.

Referring to the drawings, 1 and 2 represent longitudinal side beams, and 3 an intermediate beam bolted to said side beams. To the under side of the intermediate beam 3 is bolted or otherwise secured a furrow-opener 4, which consists of a downwardly and rearwardly extending shank portion provided along its front edge with a curved cutter 5, having a knife-edge 6 detachably secured to the shank by bolts or screws. Said cutter 5 is made detachable by means of screw-bolts or other suitable means for the purpose of allowing it to be removed for the purpose of sharpening or for the insertion of a new cutter in case one should be broken. A tube $6^a$ for conveying the seed from the hopper to the furrow is located between the beams 1 and 2 and just at the rear of the beam 3. At the rear of the tube $6^a$ is located a triangular-shaped toothed coverer $6^b$, attached to the side beams 1 and 2 by means of spring-arms $4^a$ and $5^a$, which allows the coverer to move vertically.

7 is a wheel supported by an axle 8, journaled in suitable bearings at the rear end of the side beams. This wheel serves the purpose of supporting the planter, provides means by which it may be moved, and at the same time rolls the ground after the furrow has been covered.

9 is a device for leveling the ground after the wheel has rolled it and which comprises, preferably, a flat strip 10, of wood or other suitable material, having its lower edge beveled, as at 11, and attached to the under side of the bearings of the planters by means of spring-arms 12 and 13. The rear of the planter is provided with handles 14.

15 is a sprocket-wheel mounted on one end of the axle 8 of the wheel 7, and $14^a$ is a crank mounted on the opposite end of said axle.

16 is a shaft journaled on the top of the side beams and provided with a grooved feed-roller 17, having a number of seed cups or pockets 18 in its periphery, said feed-roller being situated above and toward the rear of the top of the seed-tube $6^a$. A sprocket-wheel 19 is provided on one end of the shaft 16, and a sprocket-chain $20^a$ connects said sprocket-wheel 19 with the sprocket-wheel 15 on the axle 8, and thereby provides means for operating the feed-roller.

20 is a hopper having an opening $20^a$ at the bottom and a base-piece 21, provided with an opening 22, which fits over and embraces the upper portion of the feed-roller.

For cutting off of the seed from the hopper as each seed cup or pocket of the feed-roller is filled a detachable plate or false bottom $22^a$ is provided, which rests on the top of the side beams at the rear of the feed-roller and bears closely against the periphery of said roller, and also a slidable plate 23 is provided, which is mounted in a slot 24 in the upper face of the base-piece 21 of the hopper, one end 25 of which is of a shape to fit closely in the groove of the feed-roller, while the opposite end is curved upward and formed into a spring 26 and attached to the front end of the hopper at the point 27 by means of a screw or other means.

28 is a longitudinal slot in the sliding plate 23, and $28^a$ is a cross-slot at one end of said longitudinal slot.

29 is a pin or lug projecting upward from the base-piece 21, said pin limiting the movement of the sliding plate, and when the said plate is drawn forward and then laterally the pin will enter one end of the cross-slot and hold the said plate away from the feed-roller and allow the planter to be used to plant in continuous rows, as more fully hereinafter described.

30 and 31 are laterally-adjustable plates at the bottom of the hopper, made, preferably, of metal and each pivoted at one end on a screw or pin 33, while the opposite end of each is enlarged and provided with a lateral slot 34.

35 represents set-screws in said slots 34 for the purpose of holding said plates in the desired position. Each of the plates 30 and 31 is cut away on its inner edge 32 to form an opening for the exit of the seed from the hopper, and one of said plates is slightly wider and overlaps and is adapted to slide and be adjusted on the other plate to vary the size of the seed-opening of the hopper.

$33^a$ is a seed-agitator which works in the seed-opening of the hopper and serves to loosen and stir up the seed and prevent the same from packing and clogging said opening. Said seed-agitator comprises a shaft $34^a$, having a crank $35^a$ at one end and mounted in bearings $35^b$ on the top of the hopper and having a series of downwardly-depending fingers 36.

37 is a pitman with one end connected to the crank $14^a$ on the end of axle 8 and the opposite end connected to the crank $35^a$ on the end of shaft $34^a$, by means of which motion is communicated from the wheel 7 to the agitator $33^a$ and the agitator given an oscillating movement.

38 is a loop mounted at its opposite ends in the side beams and under which one end, preferably the rear end 39, of the base-piece of the hopper is inserted, and 40 is a pin for holding said end 39 therein, while 41 represents screws on the side beams which secure the front end 42 of the base-piece of the hopper. When it is desired to use the device for planting in continuous rows instead of in hills, the screw 41 is turned so that the straight side of its head is toward the hopper, the end of the hopper swung upward and backward with the loop 38 as its pivot, the false bottom and feed-roller and sprocket-chain $20^a$ removed, the sliding plate drawn forward and held by the pin 29 engaging the slot 28, and the hopper returned to its former position.

The operation is as follows: The seed having been placed in the hopper and the curved cutter adjusted to cut the required depth, the operator grasps the handles and propels the planter before him, or a swingletree may be provided on the end of the beam 3 and a horse or other animal used to draw the planter. As the planter advances the cutter of the furrow-opener cuts the soil and the shank of the furrow-opener throws the soil to the side, and thus prevents it from falling back into the furrow, the roller revolves and by means of its operative connections with the feed-roller and agitator in turn operates them, the seed passes from the hopper into the cups of the feed-roller and from said cups is delivered into the seed-tube and thence into the furrow, where it is covered with soil by the coverer, after which the soil is rolled by the wheel and leveled by the leveling device.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements.

Having thus described my invention, what I claim is—

1. A planter provided with a hopper, a feed-roller, seed-cut-off plates bearing against the periphery of the said feed-roller, one of said plates provided with a slot and means for engaging said slot to hold the plate when slid outward, substantially as described.

2. A planter provided with a hopper, a feed-roller, seed-cut-off plates bearing against the periphery of said roller, one of said plates provided with a longitudinal slot having a cross-slot at one end, and means for engaging said cross-slot and holding said plate in its outward position, substantially as described.

3. A planter provided with side beams, a loop having its opposite ends mounted in said side beams, a hopper having a base-piece embracing the space between the side beams and one end extending longitudinally beyond said hopper and engaging said loop, and means for securing the opposite end of said base-piece to the side beams, substantially as described.

4. A planter provided with side beams, a loop having its opposite ends secured in said side beams, and screws having their heads cut away at one side, mounted thereon, a hopper having an extended base-piece one end engaging said loop, and the opposite end secured to the side beams by means of said screws, substantially as described.

5. A planter provided with side beams, a hopper having a base-piece mounted thereon provided with a groove in its upper surface having a pin, a slidable spring-controlled cut-off plate mounted in said groove and provided with a slot with which said pin engages a detachable seed-cut-off plate, and a feed-roller, substantially as described.

6. A planter provided with side beams, a feed-roller, a hopper having a base-piece mounted thereon provided with a groove having a pin therein, a slidable cut-off plate mounted in said groove having a longitudinal slot and a communicating cross-slot at one end, said pin designed to engage said cross-slot and hold the slidable cut-off plate in its outward position, substantially as described.

In testimony whereof I affix my signature in the presence of two witnesses.

JESSIE M. ROBERTS.

Witnesses:
J. E. WILLIAMS,
A. F. ROBERTS.